(12) United States Patent
Bacon

(10) Patent No.: US 7,460,021 B1
(45) Date of Patent: Dec. 2, 2008

(54) INTERACTIVE WALLPAPER WEATHER MAP

(75) Inventor: Brad Bacon, Oxford, GA (US)

(73) Assignee: The Weather Channel, Inc., Atlanta, GA (US)

( * ) Notice: Subject to any disclaimer, the term of this patent is extended or adjusted under 35 U.S.C. 154(b) by 144 days.

(21) Appl. No.: 11/280,740

(22) Filed: Nov. 16, 2005

(51) Int. Cl.
*G01W 1/00* (2006.01)
(52) U.S. Cl. .................. 340/601; 345/619; 715/766
(58) Field of Classification Search .......... 340/601; 345/581, 619; 715/766, 835, 867
See application file for complete search history.

(56) References Cited

U.S. PATENT DOCUMENTS

| 6,795,089 | B2 * | 9/2004 | Rajarajan et al. | 715/760 |
| 7,242,406 | B2 * | 7/2007 | Robotham et al. | 715/744 |
| 2002/0113826 | A1 * | 8/2002 | Chuang | 345/835 |
| 2002/0130899 | A1 * | 9/2002 | Ryan et al. | 345/738 |
| 2005/0114800 | A1 * | 5/2005 | Rao | 715/867 |
| 2006/0107226 | A1 * | 5/2006 | Matthews et al. | 715/766 |
| 2006/0129947 | A1 * | 6/2006 | Hamzy et al. | 715/867 |
| 2006/0206803 | A1 * | 9/2006 | Smith | 715/513 |

* cited by examiner

*Primary Examiner*—John A Tweel, Jr.
(74) *Attorney, Agent, or Firm*—Woodcock Washburn LLP

(57) ABSTRACT

Systems and methods for providing a desktop wallpaper map on a user's PC desktop to provide an indication of weather conditions. The map displays weather information such as local, regional or national radar, satellite map, five day forecast, current conditions, etc. In a passive mode, the map is displayed in the background on a user's desktop. In an interactive mode, the map is preferably moved up to the foreground and additional weather data is provided, which may be customized by the user. The user may pan, zoom and change locations via controls that are provided on the desktop. A control icon is provided to toggle the map to and from passive and interactive modes.

20 Claims, 5 Drawing Sheets

INTERACTIVE WALLPAPER WEATHER MAP

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright © 2005, The Weather Channel, All Rights Reserved.

FIELD OF THE INVENTION

This invention generally relates to the field of computing devices. In particular, the present invention is directed to a system for conveying weather-related information to a user of a computing device.

BACKGROUND OF THE INVENTION

Conventional weather information products provide information with a limited level of detail and functionality. Many conventional products are pre-configured to display to mass audiences, and therefore, are not easily customized by users for their personal requirements or preferences. Because of this, it is often hard for users to gain detailed information. In addition, many of these products operate in a limited viewing space, such as a portion of a web page or a window on the user's desktop. Thus, it would be advantageous if there was a weather information product that is easily customized and provides a high level of detail. In addition, it would be advantageous if the weather information product operates in a large viewing area.

SUMMARY OF THE INVENTION

The present invention is directed to systems and methods for providing a desktop wallpaper map a user's PC desktop to provide an indication of weather conditions. The map displays weather information such as local, regional or national radar, satellite map, five day forecast, current conditions, etc. In a passive mode, the map is displayed in the background on a user's desktop. In an interactive mode, the map is preferably moved up to the foreground and additional weather data is provided, which may be customized by the user. The user may pan, zoom and change locations via controls that are provided on the desktop. A control icon is provided to toggle the map to and from passive and interactive modes.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
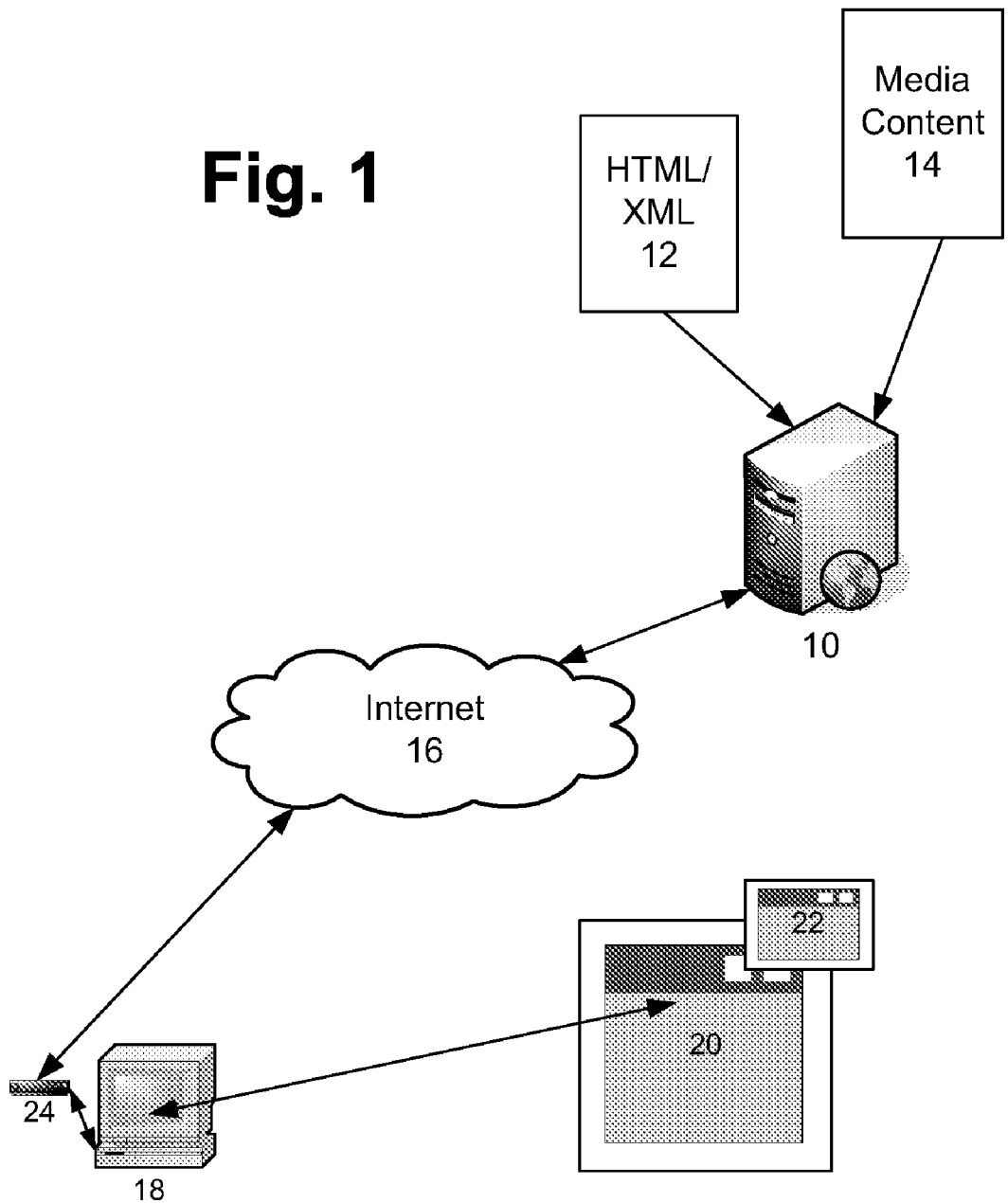
FIG. 1 is an overview of the environment in which the present invention operates.

The present invention is directed to an improved wallpaper map that includes, e.g., current meteorological conditions and local content of interest, such as, restaurant listings, nightlife, special events, news, etc., related to wallpaper map events. In addition, the wallpaper map is presented on, e.g., a user's desktop, and is accessible without requiring the user to launch a separate wallpaper map application. Referring to FIG. 1, there is illustrated an overview of the environment in which the present invention operates. As shown in FIG. 1, a personal computer 18 runs a web browser or thin client 20 to fetch and display HTML/XML documents and/or data. In this implementation, the web browser 20 may be any known web browser such as Internet Explorer, Netscape Navigator, Mozilla Firefox, or a proprietary thin client or window that is adapted to display information. The web browser/thin client 20 fetches HTML/XML documents from a web server 10 via a modem 24 (e.g., cable modem, DSL modem, or conventional modem) connected to the Internet 16. The web server 10 serves, e.g., HTML/XML documents 12 and media content 14. The media content may include such as flash media, video, audio, still images, etc. and may be played by a player 22 or the thin client 20.

When a user connects to retrieve documents/data, the browser or thin client 20 points to a specified URL of the document/data to be retrieved. A TCP/IP connection is established with the web server 10 and a request is issued for the document stored at the specified URL by issuing an HTTP request to the server 10. In addition to HTML (XML) code, this document can incorporate other information content, such as images, audio, video, executable programs, etc. The document 12 and images are stored as files in a file system of the web server 10. The document 12 may incorporate the images using HTML tags that specify the location of files or other Internet resource containing the images on the Internet 16. In addition, the thin client 20 may receive data through XML and images and render the content directly on the desktop.

Figure 2:
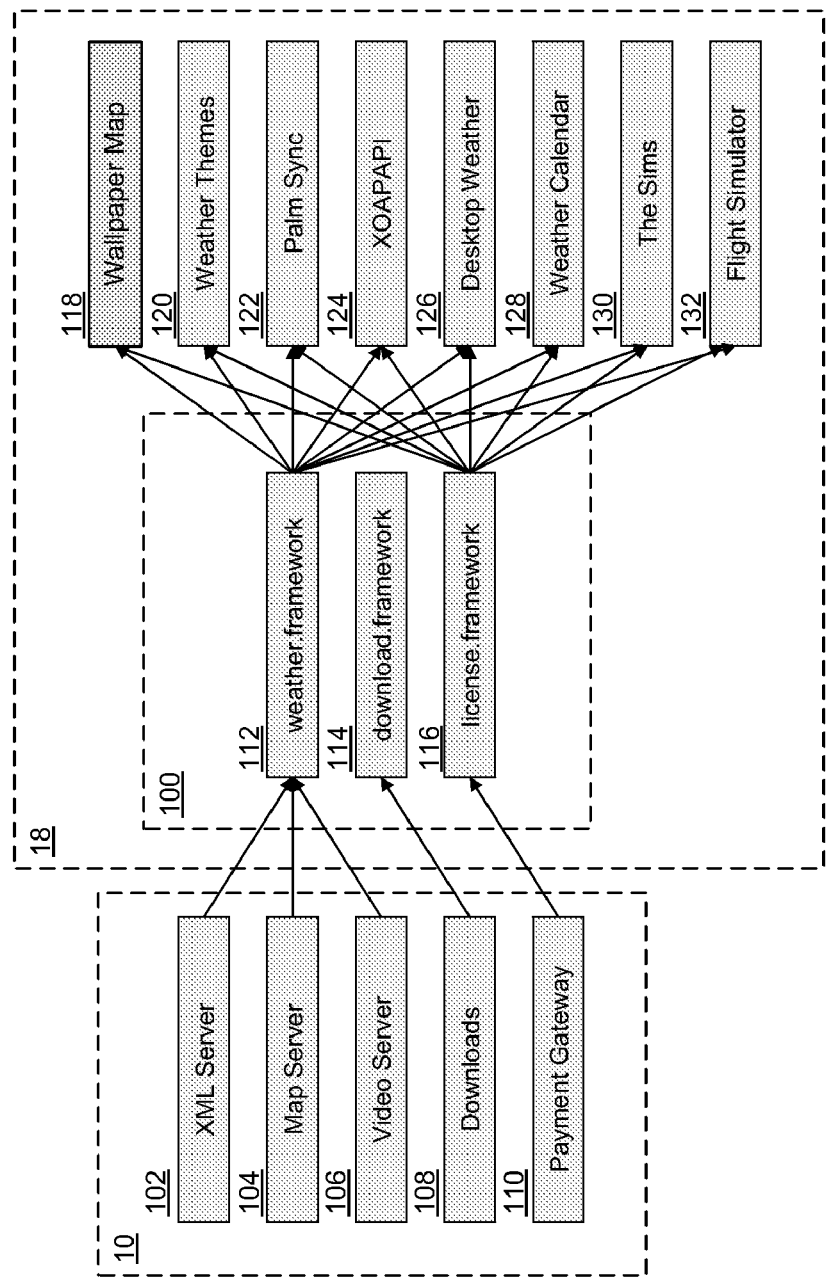
FIG. 2 is a block diagram overview of the various components of a desktop framework in which the present invention may be embodied.

Referring now to FIG. 2, there is illustrated a more detailed view of the environment of FIG. 1. The environment may include a desktop framework 100 that provides a platform upon which to build weather-related applications (or other). Weather information is provided by, e.g., The Weather Channel's weather.com website and is made available to any application that is licensed to use the data. In accordance with the framework, all applications have a consistent and reliable interface for the data. While the embodiment below is described with respect to weather data and applications, it is noted that other types of data and applications will benefit by operating within the framework 100.

Servers 102-110 provide data, application downloads and licensing to the desktop framework 100 via a wide area network (WAN) such as the Internet 16. In the present embodiment, weather data is served by an XML Server 102, images come from a Map Server 104, and videos would be produced by a Video Server 106. There would also be a collection of client applications that are stored on download servers 108. A payment gateway 110 provides a communications connection with a third party payment service to enable end users to purchase additional applications and services. Collectively, these servers may be referred to herein as the web server 10. (In accordance with an aspect of this invention, the server 102 may also provide information from a database of events and forecasts).

The components, libraries and user interface elements of the desktop framework 100 will now be described. The framework components themselves are divided between a system-level user interface and collection of shared libraries implementing desktop application services. These services include the retrieval, storage, and presentation of weather data, the browsing, install; and updating of desktop applications; and the authentication and verification of downloaded files prior to installation.

A weather.framework 112 component is an application framework that provides the core libraries that are installed on the user's computer. The weather.framework 112 provides the ability for other programs to request weather data in one or more of the operating system's native formats. The weather.framework 112 encapsulates system level access to current and cached weather data from weather.com's services. Using only a single instance of weather information on the user's computer increases consistency and improves efficiency of both the client and server.

The weather.framework 112 state engine maintains the current state of the data model and tasks that need to be executed according to predefined rules. An example of a state-related task is the need to fetch current conditions every 30 minutes. A weather.framework cache holds weather data locally on the user's machine in accordance with rules defining the aging of the cache. This reduces load on the server and allows applications to use some information even when the computer is not connected to the Internet.

The weather.framework 112 resources include icons and translation tables to correctly present the weather data. Having the resources locally reduces the server load and bandwidth and allows the icons and imagery to be used when the computer is not connected to the Internet. Framework Meta-APIs are language independent specifications of the functions and data types for a given framework. External APIs then implement these functions and data types in a given language and for a given Operating System. For example, desktop framework applications may access weather data through weather framework APIs such as: C++ (Windows, Linux), Net (Windows), Cocoa (Macintosh), JavaScript (DHTML) and Java (Server Applications).

The user interface for the weather.framework 112 is a set of dialog boxes that collect user preferences for system-wide weather configuration. A preferences dialog collects user information such as: Location, Units, and Display of Severe Weather Alerts. A weather.framework key may be used that is a cryptographic license verifying the identity of the framework and allowing it access to the weather.com services.

The connection between the weather framework 112 and the Weather Servers 102-108 could be on-demand or always-open, allowing for true push alerts and even push-weather. The weather.framework 112 also implements a local weather database with cached results to previous queries. As an alternative, the weather.framework 112 may implement peer-to-peer connections between clients to collect and distribute weather data in order to reduce the bandwidth and resource burden on the servers 102-108.

A download.framework 114 component is responsible for maintaining the versions of the software installed on the user's computer. The download.framework 114 updates the weather.framework 112 as new versions of files are released and allows users to install new software without using a web browser or other connection to the Internet.

The download.framework 114 contains the core user interface and system processes to download and install new and updated applications. The User Interface provides the user dialogs to register, download, and configure framework applications from the application catalog. A System Preferences dialog preferably conforms to the Operating System's standards for control-panels and contains global configuration settings such as: Username, Password, Address, Age, Gender, Auto-Update, Auto-Notify, and Network Settings. In addition to being stored locally, the information may be communicated back to an XML URS database server. The URS database server is a Universal Registration System. It contains all user and product preferences in a centralized database at weather.com (or other service provider). Framework products preferably collect data from the user and send it to URS for centralized storage and authentication.

A Software Catalog displays all of the software available for that Operating System and indicate what software is currently installed. Additionally, the catalog will provide descriptions of the products. If the user has selected to be notified when new versions of the installed software are available, an Update Notification dialog will alert them when the software catalog is updated. If the user has selected to be notified when new software is added to the catalog, a New Application Notification dialog will alert them when the software catalog is updated.

A Version Checker uses the framework's list of installed applications on the user's computer and checks periodically with the download server 108 to determine if there are new or updated products available for that Operating System. If new or updated software is available, the software is either automatically installed or the user is notified of the update. A Downloader downloads new applications and software updates to the user's computer. It can do this interactively, when the user chooses to install new software form the Catalog, or in the background, when an update becomes available for software that is already installed. A Verifier uses checksums and encryption keys to verify that the downloaded software is authentic and not corrupt before it is installed.

An Installer installs new or updated software on the user's computer. It will also uninstall any framework software the user wants to remove. A Download Framework key is used to verify the authenticity of the framework components, since the Download Framework has the ability to update itself. A Framework Uninstaller is a separate, external program that allows the user to uninstall all desktop framework components.

A license.framework 116 component is responsible for keeping track of data use and registration information. Some data may be provided free of charge and other data may require a subscription. Similarly, some allocations may require registration and opt-in co-registration, while others may have paid advertising in them. The license.framework 116 component interacts with URS and billing to maintain the user's profile and, in the case of subscription products, bill them accordingly.

The license.framework 116 provides an interface to or its own implementation of, standard cryptographic libraries necessary for SSL and other encrypted network communications. Also, it provides an interface to or its own implementation of the client components of a Public Key Infrastructure (PKI) that allows authentication and verification of programs downloaded to a user's computer. The license.framework 116 also provides the framework for securing access to desktop framework data and restricting the programs that use the framework APIs.

The download.framework 114 communicates with the download services over SSL and the registration and co-registration transactions for individual application use SSL to protect user data. The content provided may generate its own SSL certificates for the SSL transactions. The content provider may also have its own certifiers and will issue certificates to each Framework and framework application. The frameworks will be able to verify the validity of an application using its public key and allow or deny access to the data accordingly. The license.framework 116 will also have its own key to verify its authenticity.

Thus, the framework components 112-116 in this embodiment reside on top of the services architecture (i.e., servers 102-110). By using common services and assets such as the weather XML feeds, maps, and URS, the desktop framework 100 will remain current with other services and leverage the web, wireless, and broadband development efforts.

Many different desktop applications may be developed to interact with the desktop framework 100. The exemplary applications are shown as reference numerals 118-132 and are not intended to limit the scope of the present invention as many additional applications may interoperate with the desktop framework 100.

It is noted that the applications and other facets of the desktop framework are intended to be installed on a personal computer. The operation of a personal computer is well known by those of ordinary skill in the art. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In accordance with the present invention, an application provided in the framework 100 is a wallpaper map application 118 that provides a weather map as wallpaper on a user's desktop. The map may be customized and updated. The updates may automatically occur in the background to provide a current view of the weather conditions. The map may be toggled between an interactive mode and a passive mode, as described below.

Figure 3:
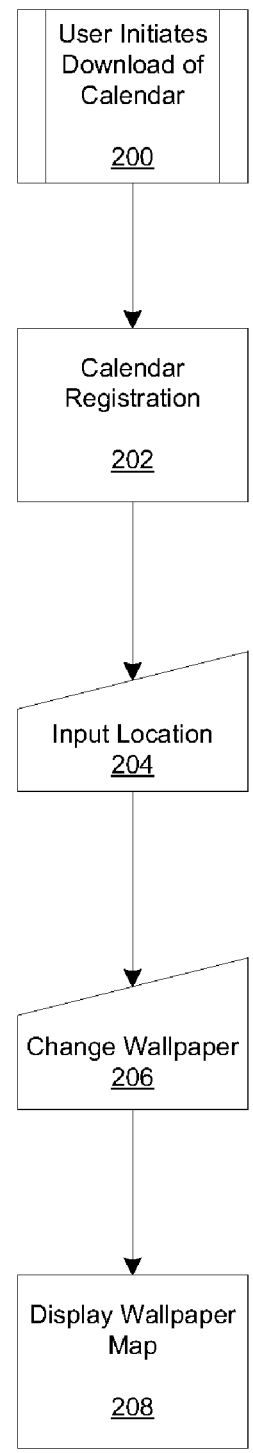
FIG. 3 is a flowchart of the exemplary processes performed to install the wallpaper map application of the present invention.

Referring to FIG. 3, there is illustrated an exemplary process by which a user installs the interactive wallpaper map application 118. As step 200 the user initiates a download from, e.g., download server 108. The wallpaper map application 118 is registered with the framework 100 at step 202. Next, the user may be asked to provide location information at step 204. This may be used to populate the wallpaper map with local weather information, etc., as described below. Next, the user may be prompted to change the desktop wallpaper to the wallpaper map application 118 to display the map (step 208). In an environment running the MICROSOFT WINDOWS operating system, the wallpaper map may be displayed on the user's desktop using an ACTIVEX control. Other operating systems may be supported via known mechanisms for providing desktop wallpaper. Optionally, the wallpaper map application 118 may be provided as a stand-alone application that is installed on the user's computer. The stand-alone application would perform the functions described herein with regard to the wallpaper map application 118.

Figure 4:
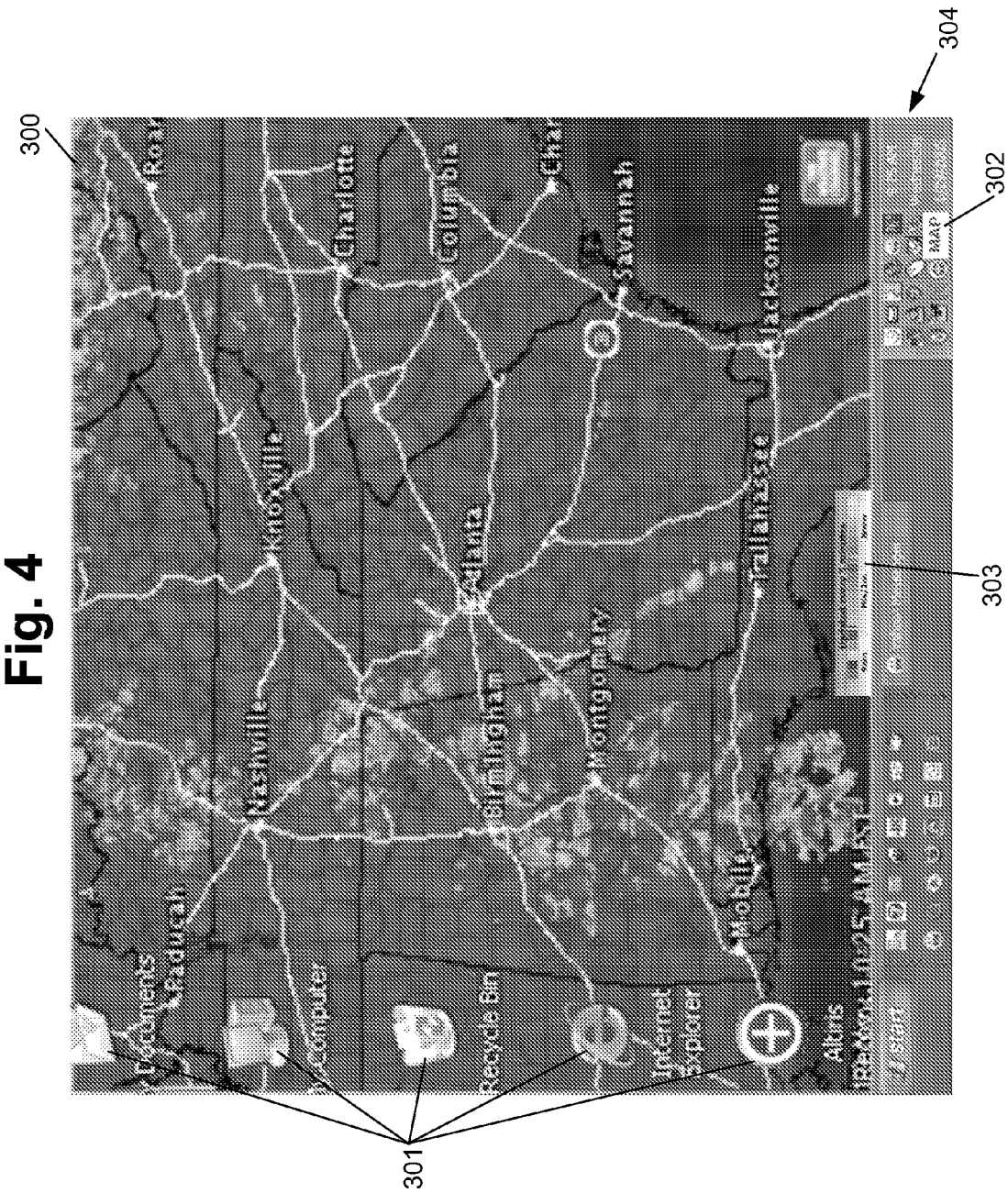
FIGS. 4-5 are exemplary graphical interfaces illustrating the wallpaper map of the present invention.
Figure 5:
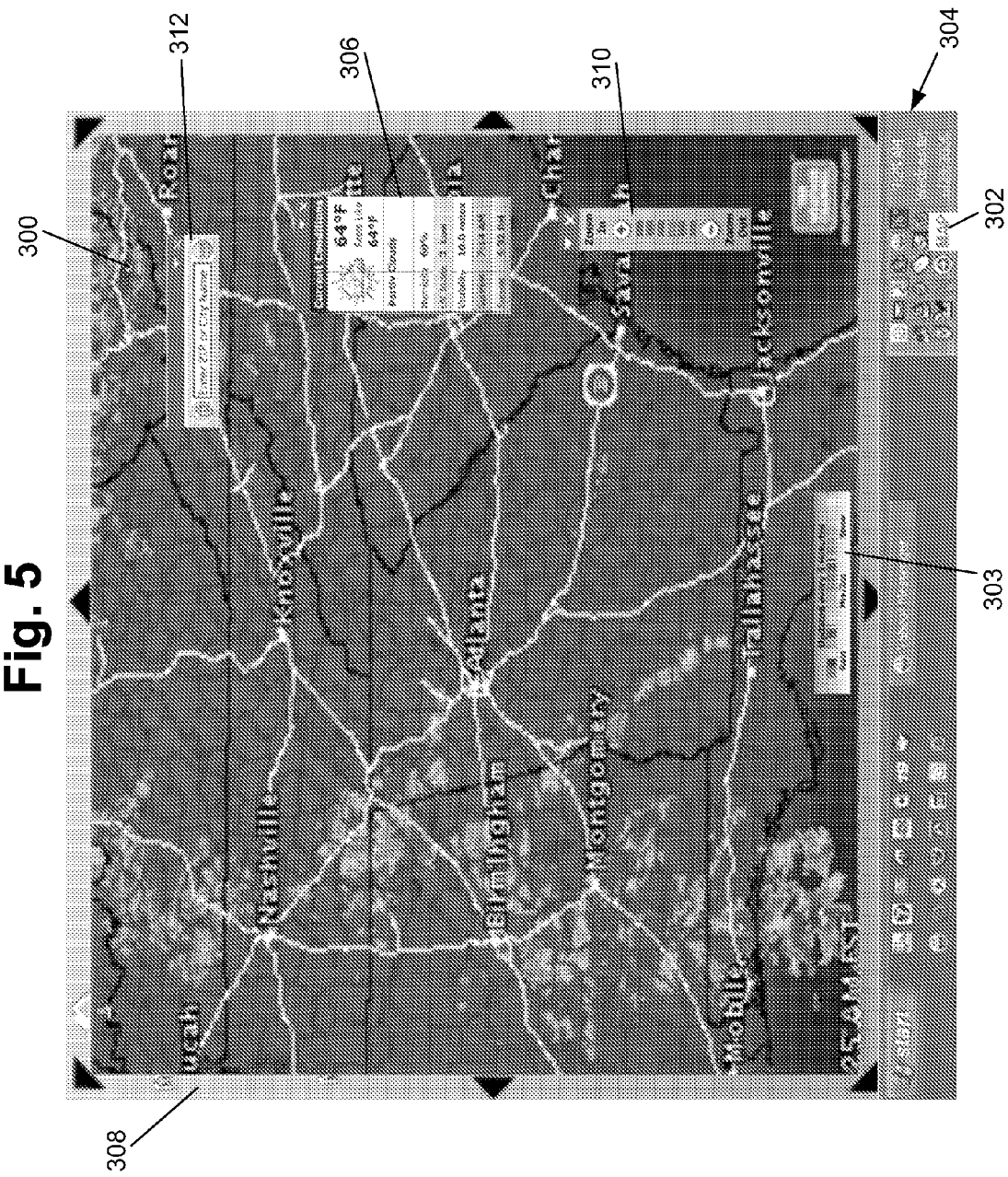

Referring now to FIGS. 4-5, there are illustrated user interfaces that may be implemented. FIG. 4 illustrates a wallpaper map 300 in passive mode. The map 300 displays a regional radar, or other weather information (e.g., local radar, national radar, satellite map, five day forecast, current conditions, etc.) In passive mode, the map is located at a z-level below the icons 301 found on the user's desktop. The map 300 is displayed in the background and does not provide an interface for user interaction. A legend 303 is provided to shown types of precipitation and a refresh interval. As shown, the map 300 is refreshed every 5 minutes. However, another interval may be used depending on weather conditions to provide current information to the user. A control icon 302 is provided in the desktop tray 304 that is used to toggle the map to and from passive and interactive modes.

Clicking the control icon 302 in FIG. 4, transforms the map 300 into interactive mode, as shown in FIG. 5. In interactive mode, the map is preferably moved up to a z-level above the desktop icons. Additional weather data 306 is provided, which may be customized by the user. The user may pan, zoom and change locations via controls 308-312 that are provided on the desktop. In interactive mode, the wallpaper map 300 and/or additional weather information 306 may be updated in accordance with the data being displayed (e.g., severe weather track information, etc.). The map may be changed to show other information, such as satellite, different types of radar imagery, etc. Clicking the control icon 302 in interactive mode will toggle the desktop to passive mode.

The wallpaper map application 118 may be implemented on a personal digital assistant (PDA), mobile telephone, or other handheld devices as well. Here, the wallpaper map application 118 may interact directly with the server 102 to retrieve data without the need for the desktop framework 100 in order to accommodate memory and processor limitations of handheld devices. The wallpaper map application 118, as applied to handheld devices, would operate substantially as noted above with regard to FIGS. 3-5 and place a wallpaper map 300 as wallpaper on the, e.g., mobile phone, PDA, BlackBerry, etc.

While the present invention has been described in connection with the preferred embodiments of the various Figs., it is to be understood that other similar embodiments may be used or modifications and additions may be made to the described embodiment for performing the same function of the present invention without deviating therefrom.

What is claimed is:

1. A method of displaying a wallpaper map in a computing device, comprising:
   providing said wallpaper map conveying graphical and weather information on a user desktop;
   periodically updating said graphical and weather information; and
   providing an icon to set a mode of said wallpaper map, wherein said mode comprises an interactive mode and a passive mode, and wherein said interactive mode and said passive mode display said graphical and weather information in said wallpaper map on said user desktop.

2. The method of claim 1, said displaying further comprising in said passive mode providing said wallpaper map at a z-level below icons on said desktop.

3. The method of claim 1, said displaying further comprising in said interactive mode:
   providing additional weather information, wherein said additional weather information is customized;
   providing user controls for user interaction; and
   periodically updating said additional weather information without user interaction.

4. The method of claim 3, further comprising:
  displaying said wallpaper map at a z-level above icons on said desktop; and
  displaying said user controls and said additional weather information at a z-level above said wallpaper map.

5. The method of claim 3, said user controls comprising at least one of a pan, zoom and location control.

6. The method of claim 1, further comprising providing a legend describing information displayed by said wallpaper map.

7. The method of claim 1, further comprising providing said icon to set said mode in a desktop tray area.

8. A system for providing a desktop wallpaper map on a computing device, comprising:
  a wallpaper map application that presents said desktop wallpaper map;
  a mode control that sets a presentation mode of said desktop wallpaper map, wherein said presentation mode comprises an interactive mode and a passive mode; and
  a download component that periodically retrieves information, wherein said information is presented and updated in said desktop wallpaper map, and wherein when said desktop wallpaper map is in said interactive mode and said passive mode said information is displayed in said desktop wallpaper map.

9. The system of claim 8, wherein said mode control sets said desktop wallpaper map in one of said interactive mode and said passive mode.

10. The system of claim 9, wherein when said desktop wallpaper map is in said passive mode, said desktop wallpaper map is displayed at a z-level below icons on a desktop, and wherein said desktop wallpaper map is updated via said download component.

11. The system of claim 9, wherein when said desktop is in said interactive mode, additional weather information and user controls are provided, and wherein said desktop wallpaper map and said additional weather information is updated via said download component.

12. The system of claim 11, wherein said desktop wallpaper map is displayed at a z-level above icons on a desktop, and wherein said user controls and said additional weather information are displayed at a z-level above said desktop wallpaper map.

13. The system of claim 11, said user controls comprising at least one of a pan, zoom and location control.

14. The system of claim 8, wherein a legend is provided on said desktop wallpaper map describing information displayed by said desktop wallpaper map.

15. A method of presenting graphical and weather information on a desktop of a computing device, comprising:
  providing a visual display of said graphical and weather information on said desktop;
  periodically updating said visual display; and
  providing a mode control to set attributes of said visual display, wherein said mode control comprises a first mode and a second mode, wherein said first mode provides said visual display showing said graphical and weather information, and wherein said second mode provides said visual display showing a superset of said graphical and weather information.

16. The method of claim 15, further comprising providing at least one of a pan, zoom and location controls in said second mode.

17. The method of claim 15, said graphical and weather information comprising a radar image, and said superset of said graphical and weather information comprising at least current conditions.

18. The method of claim 17, further comprising providing said graphical and weather information at a z-level above icons on a desktop in said second mode.

19. The method of claim 15, further comprising providing said graphical and weather information at a z-level below icons on a desktop in said first mode.

20. The method of claim 3, wherein said additional weather information is changed based on interaction with said user controls.

* * * * *